United States Patent Office 3,557,228
Patented Jan. 19, 1971

3,557,228
DEHYDROHALOGENATION OF HALOGENATED ORGANIC COMPOUNDS IN DIMETHYL SULFOXIDE SOLVENT
Patricia H. Moyer and Siegfried E. Penner, Wichita, Kans., assignors to Vulcan Materials Company, Birmingham, Ala., a corporation of New Jersey
No Drawing. Filed Jan. 17, 1969, Ser. No. 792,171
Int. Cl. C07c 17/34, 21/06, 21/08
U.S. Cl. 260—653.5                                    9 Claims

ABSTRACT OF THE DISCLOSURE

A liquid system containing an alkali metal hydroxide or a quaternary ammonium hydroxide dispersed or dissolved in a solvent which comprises dimethyl sulfoxide is used to dehydrohalogenate halogen-containing organic compounds in liquid phase. This dehydrohalogenation system is particularly useful in making vinylidene fluoride at high conversion and high selectivity by dehydrohalogenation of 1,1,1-halodifluoroethane in liquid phase.

BACKGROUND OF INVENTION

Vinylidene fluoride, $CH_2=CF_2$, is a monomer of considerable interest because of its use in the manufacture of tough and unusually resistant resinous homopolymers and elastomeric copolymers. Vinylidene fluoride has been prepared from 1,1,1-chlorodifluoroethane by dehydrochlorination at high temperatures in the vapor phase either in the presence or in the absence of catalysts. The chlorodifluoroethane may be prepared from 1,1,1-trichloroethane as shown in Equation 1.

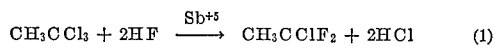

$$CH_3CCl_3 + 2HF \xrightarrow{Sb^{+5}} CH_3CClF_2 + 2HCl \quad (1)$$

It could also be prepared from acetylene by the sequence shown in Equations 2 and 3.

$$CH\equiv CH + 2HF \rightarrow CH_3CHF_2 \quad (2)$$

$$CH_3CHF_2 + Cl_2 \rightarrow CH_3CClF_2 + HCl \quad (3)$$

$$CH_3CClF_2 \rightarrow CH_2=CF_2 + HCl \quad (4)$$

Reaction 2 is well-known and has been carried out with a variety of catalysts which are described in the prior art. Reaction 3 is a photochlorination step which is also well-known and described in the journal literature as well as in patents. Reaction 4 has previously been thoroughly studied and commercially practiced in high temperature vapor phase systems. However, contaminants requiring costly removal are formed in the best of such previously known systems. Products of very good purity have been obtained in other known vapor phase processes, but only at low conversions. U.S. Pats. 2,774,799 and 3,246,041 are representative of such prior art.

1,1,1-chlorodifluoroethane has not been heretofore successfully dehydrochlorinated with alkali under any conditions, even when it is liquefied or emulsified in the reaction mixture or even when molten sodium or potassium hydroxide is used. See Walker and Pavlath, J. Org. Chem., 30, 3284 (1965).

Indeed, it is well recognized in the art that the dehydrochlorination of most chlorofluorolkanes is an unusually difficult reaction to achieve when either the hydrogen atom or the chlorine atom to be eliminated is attached to a carbon atom which also contains a fluorine atom. To achieve such a reaction in a selective manner, with a minimum of side reactions, is even more difficult.

It is among the objects of this invention to provide an improved process for the selective dehydrohalogenation of halogen-containing organic compounds. A specific object is to make vinylidene fluoride more economically than heretofore. Another specific object is to dehydrochlorinate 1,1,1-chlorodifluoroethane at a relatively fast rate, efficiently and with a high degree of selectivity, so as to avoid or minimize costly removal of contaminants from the desired product.

DESCRIPTION OF INVENTION

The present invention involves a dehydrohalogenation reaction of the kind illustrated by Equation 4 using a strong base in dimethyl sulfoxide solvent. All other solvents tried have been found to be much less effective in facilitating the dehydrohalogenation of a compound such as 1,1,1-chlorodifluoroethane and to result more extensively in side reactions. Most particularly the invention involves a process for dehydrochlorinating 1,1,1-chlorodifluoroethane using an alkali metal hydroxide or a quaternary ammonium hydroxide in dimethyl sulfoxide (DMSO), preferably as a heterogeneous suspension which may contain water in small amounts. If it is intentionally desired to reduce the strength of the dehydrohalogenation agent to a particular level so as to moderate the dehydrohalogenation, the hydroxide/DMSO mixture may be similarly used as an aqueous, homogeneous phase. Such moderation may be necessary or preferred in certain cases, for instance, when treating more reactive compounds than 1,1,1-chlorodifluoroethane.

When proceeding in accordance with this invention, vinylidene fluoride can be produced according to the reaction shown by Equation 5.

$$CH_3CClF_2 + NaOH \rightarrow CH_2=CF_2 + NaCl + H_2O \quad (5)$$

with the following results:

|  | $CH_3CClF_2$ | NaOH |
|---|---|---|
| Overall conversion, percent | 75.2 | 99.1 |
| Selectivity to $CH_2=CF_2$ | 99.2 | 97.0 |

The reaction is relatively fast. Under preferred conditions, the sole byproducts of any significance are about 0.5–1% sodium acetate formed by complete hydrolysis of the starting compound and less than 0.3%, e.g., about 0.1%, 1,1-chlorofluoroethylene formed by the loss of HF instead of HCl from the starting compound.

Typical conditions adapted to give the above results are listed below together with the effects of changing controllable variables.

(a) Temperature: 50° C. (Practical range: 20° to 100° C., preferably 40° to 60° C.) A reduction of temperature reduces the rate of reaction and an increase in temperature increases side reactions, e.g., formation of acetate.

(b) Pressure: 75 p.s.i.g. (Practical range: 0–200 p.s.i.g., preferably 50 to 80 p.s.i.g.) The rate of conversion tends to increase with increasing pressure between 0 and 75 p.s.i.g. At pressures higher than 75 p.s.i.g., there is usually little, if any, additional advantage; and condensation of the gaseous feed to the liquid state may occur in the reactor at pressures exceeding 85 p.s.i.g. and cause complications in separating unreacted material for recycle.

(c) Solvent: Dimethyl sulfoxide with 5% water. (Practical water dilution: 0 to 70%, preferably 2 to 10%.) DMSO proved far superior to all other solvents tested. However, other polar solvents compatible with the base, e.g., ethanol or bis(2-methoxyethyl) ether or dimethyl formamide, may be used in place of water. Concentrated DMSO which contains about 5% or less water or other polar solvent and gives rise to a heterogeneous slurry system with the solid base is better than DMSO which contains 30% water or more and which gives rise either to two liquid phases or to a homogeneous system, depending upon the base concentration and solubility. NaOH is rather insoluble in DMSO. For example, 37% water is required to obtain a solution containing 2.4% NaOH, and 53% water is required for a 7.8% NaOH solution. While both the heterogeneous system and the homogeneous liquid base system gives good selectivity, the dehydrochlorination rate is substantially higher in the heterogeneous system. The greater difficulty in removing NaCl from the aqueous solvent in the homogeneous system in order to reuse the solvent also points toward the slurry process as the most practical.

(d) Base: About 2 to 30 parts, preferably 15 to 20 parts, of powdered sodium hydroxide suspended or dissolved in 100 parts of above solvent. Potassium hydroxide proved equivalent to NaOH in both the heterogeneous and homogeneous phase operations. Quaternary or tetraalkyl ammonium hydroxides, $R_4NOH$, also are very efficient, especially when used in the homogeneous phase. Tetramethylammonium hydroxide, which is representative of the useful quaternary ammonium hydroxides, gave a faster rate than NaOH in homogeneous phase but also gave somewhat more side reactions. Instead of tetramethylammonium hydroxide, other tetraalkyl ammonium hydroxides containing from 1 to about 4 carbon atoms per alkyl group, such as tetraethyl or tetra-n-butyl ammonium hydroxides are similarly useful. The four lower alkyl groups attached to the nitrogen atom may be the same or they may be different. Still other bases, such as LiOH or BaO, were also found to be usable though many times less effective. A slurry of solid base with the solvent is as a rule more effective than a homogeneous solution of the same base.

(e) Feed rate: Fluorocompound feed rate may be varied fairly arbitrarily over a wide range. Higher rates tend to increase the amount of product formed per unit time at the expense of lower overall conversion of the feed.

(f) Stirring rate: Ineffective gas liquid mixing causes a lower rate of reaction. Stirring should be sufficient to assure good gas liquid mixing. Of course, optimum stirring conditions depend somewhat on size and other characteristics of the system used, but can be readily determined by routine preliminary testing for each particular case.

The invention was made and found to be exceptionally effective in connection with the production of vinylidene fluoride by the selective dehydrochlorination of 1,1,1-chlorodifluoroethane. However, the very powerful and selective dehydrohalogenation reagent used herein has subsequently also been found broadly useful in dehydrohalogenating fluorine-containing compounds corresponding to the formula $CH_2Z—CFXY$ wherein X is a halogen and Y and Z are independently selected from the group consisting of halogen and hydrogen with the proviso, however, that the molecule contains at least one halogen other than fluorine attached to one carbon atom and at least one hydrogen attached to the adjacent carbon atom. Most typically, such a compound will correspond to the formula $CH_3—CFXY$ wherein X is a halogen and Y is hydrogen or a halogen other than fluorine with the proviso that X is a halogen other than fluorine when Y is hydrogen. For economical reasons, the halogen to be removed by dehydrohalogenation is preferably chlorine, such that the preferred starting compounds are 1,1,1-chlorodifluoroethane and 1,1-chlorofluoroethane. However, the corresponding bromofluoro and iodofluoro compounds are similarly operable. Accordingly, besides the manufacture of vinylidene fluoride the invention may be used to make vinyl fluoride from 1,2-chlorofluoroethane or from ethylidene chlorofluoride (1,1-chlorofluoroethane) or from ethylidene bromofluoride or iodofluoride; or vinylidene chlorofluoride from 1,1,1-bromochlorofluoroethane or from 1,1,1-dichlorofluoroethane; or vinylidene bromofluoride from 1,1,1-dibromofluoroethane or from 1,1,1 - iodobromofluoroethane; and so forth.

Moreover, the base/DMSO reagent described herein may be used with varying degrees of effectiveness not only for the selective dehydrohalogenation of a variety of simple, incompletely halogenated fluorinated organic aliphatic compounds but also for the dehydrohalogenation of other organic compounds containing at least one halogen other than fluorine and at least one hydrogen atom on adjacent carbon atoms of the molecule. For instance, benzene hexachloride, $C_6H_6Cl_6$, may be readily dehydrochlorinated at a relatively low temperature such as 50° C. with the aid of the presently disclosed base/DMSO reagent to yield trichlorobenzene. Similarly, it may be used to dehydrochlorinate solid, high molecular weight polymers if the strength of the reagent is appropriately moderated. Obviously, the invention should be used wtih great care if the compounds treated can form explosive chloroacetylenes by dehydrohalogenation.

To further illustrate the nature, operation and effectiveness of the invention a number of runs are described below in detail. Of course, these runs are described only by way of example and the described procedures may be modified in various ways by persons skilled in the art without departing from the spirit of the present invention or the scope of the appended claims. It should be further understood that in these examples, as throughout this entire specification, all proportions of materials are expressed on a weight basis unless some other basis is indicated.

DESCRIPTION OF ILLUSTRATIVE RUNS

The principal starting materials used were 1,1,1-chlorodifluoroethane ("Genetron 142b"), powdered sodium hydroxide and dimethyl sulfoxide.

As indicated by chromatographic analysis, the chlorodifluoroethane was essentially pure, containing only a trace of two lighter impurities. High purity of this starting material is of course desirable in order to assure high product purity but is not otherwise critical.

The powdered sodium hydroxide used in this work was the byproduct from a commercial sodium hydroxide flaking operation. Typically, the assay of various batches of such sodium hydroxide showed about 95.0 to about 97.5% NaOH and about 2% NaCl, the remainder being principally water and sodium carbonate. The particle size range of the various batches used ranged from about 0.02–0.06 mm. to 0.06–0.4 mm. but is not in any way critical. The proportion of NaCl also is not critical as more of it forms in the course of the reaction in any event.

The dimethyl sulfoxide used was a commercial grade product made by the Crown-Zellerbach Company. It contained no detectable dimethyl sulfide and less than 0.2% water by chromatographic analysis.

One series of runs, summarized in Table I, was conducted in a 1-liter stainless steel autoclave with a mechanical rotary paddle stirrer. The head was assembled onto the reactor and solvent and base were then charged through a large port. This was closed, the reactor was heated to the desired temperature, and the 1,1,1-chlorodifluoroethane was metered in as a liquid (B.P. −9.2° C.) from a pressure cylinder through a rotameter until the desired pressure was reached in the reactor. The outlet valve was then opened just enough so that this pressure was maintained at the predetermined feed rate. The amount of gas evolved was read at intervals from a wet test meter in the outlet line. Samples for chromatographic analysis were taken into an evacuated sample bomb at a 3-way stopcock in the outlet line. Following a run, the reaction mixture was filtered so that the solvent could be reused. The solids obtained in the filtration were dissolved in water which was combined with rinsings from the reactor, and the resulting water solution as well as the solvent (filtrate) were analyzed.

Another series of runs, reported in Tables II and III, was conducted in a 500 ml. round-bottom flask equipped with a Teflon polytetrafluoroethylene paddle stirrer, thermometer, below-the-surface gas inlet terminating in a 1 mm. hole, and condenser. The stirrer was powered by a variable speed stirring motor. The reactant gas was metered at 20 p.s.i.g. through a rotameter, whence it passed through a water saturator, wet test meter, a drying tube, and into the reactor. The product gas passed through a condenser, a 3-way stopcock which permitted sampling for chromatographic analysis, weighed drying tube to trap vapors from the reaction mixture, water saturator, and wet test meter. In some cases one or both meters were omitted.

TABLE I.—DEHYDROCHLORINATION OF 1,1,1-CHLORODIFLUOROETHANE UNDER PRESSURE

Charge:
600 g. Dimethyl sulfoxide
110 g. Powdered NaOH

| Run number | 1 | 2 | 3 | 4 | 5 | 6 | 7 | 8 |
|---|---|---|---|---|---|---|---|---|
| Conditions: | | | | | | | | |
| Temperature, °C | 23 | 50 | 50 | 50 | 50 | 50 | 50 | 50 |
| Pressure, p.s.i.g | 30–40 | 195 | 195 | 195 | 75 | 75 | 45 | 00 |
| Stirring rate, r.p.m | | | | | 1,540 | 1,010 | 1,540 | 1,540 |
| Input rate of $CH_3CClF_2$, mM./min | 78 | 78 | 78 | 78 | 114.6 | 118.6 | 57.5 | 19.7 |
| Time of reaction, minutes: | | | | | | | | |
| Until input of $CH_3CClF_2$ stopped | 30 | 39 | 40 | 39 | 30 | 30 | 57.5 | 140.5 |
| Until gas evolution from reactor stopped | 120 | 101 | 100 | 78 | 36.5 | 35 | 62 | 140.5 |
| Amount NaOH charged, mM | 2,671 | 2,668 | 2,672 | 2,670 | 2,672 | 2,665 | 2,665 | 2,671 |
| Batch of NaOH used | II | II | II | II | III | III | III | III |
| Initial weight percent: | | | | | | | | |
| $H_2O$ | 5.0 | 0 | 5.0 | 14.9 | 5.0 | 5.0 | 5.0 | 5.0 |
| NaCl | 0.90 | 0 | 0.90 | 1.88 | 0.90 | 0.90 | 0.90 | 0.90 |
| $CH_3COONa$ | 0.50 | 0 | 0.50 | 0.75 | 0.50 | 0.50 | 0.50 | 0.50 |
| Results: | | | | | | | | |
| Extrapolated initial rate, $CH_3CClF_2$ to $CH_2=CF_2$, mM./min | | | | | 107 | 93.4 | 52 | 18.3 |
| Percent conversion: | | | | | | | | |
| $CH_3CClF_2$ | 27.2 | 42.6 | 76.7 | 30.8 | 75.2 | 72.6 | 76.1 | 86.5 |
| NaOH | 25.9 | 97.0 | 90.9 | 60.7 | 99.1 | 99.0 | 99.1 | 98.8 |
| Percent selectivity: | | | | | | | | |
| $CH_3CClF_2$ to $CH_2=CF_2$ | 99.6 | 99.7 | 99.0 | 99.5 | 99.2 | 99.4 | 99.1 | 97.7 |
| $CH_3CClF_2$ to $CH_3COONa$ | 0.42 | 0.26 | 1.03 | 0.55 | 0.77 | 0.62 | 0.91 | 1.34 |
| Percent of reacted NaOH used to make $CH_2=CF_2$ | 98.4 | 99.0 | 96.0 | 97.8 | 97.0 | 97.6 | 96.5 | 94.8 |
| Material balances: | | | | | | | | |
| Percent NaOH accounted for | 108.5 | 97.1 | 98.6 | 94.4 | 99.9 | 99.7 | 97.7 | 97.6 |
| Comparison of starting material converted with NaCl formed | | | | | 112.7 | 96.5 | 95.3 | 95.4 |

TABLE II.—DEHYDROCHLORINATION OF 1,1,1-CHLORODIFLUOROETHANE AT ATMOSPHERIC PRESSURE

Charge:
330 g. Dimethyl sulfoxide
60 g. Powdered NaOH
Input rate of $CH_3CClF_2$: 10 mM./min.

| Run number | 9 | 10 | 11 | 12 | 13 | 14 | 15 | 16 | 17 | 18 | 19 | 20 | 21 |
|---|---|---|---|---|---|---|---|---|---|---|---|---|---|
| Conditions: | | | | | | | | | | | | | |
| Temperature, °C | 35 | 50 | 50 | 50 | 50 | 50 | 50 | 50 | 70 | 90 | 90 | 90 | 90–130 |
| Rate of stirring, r.p.m.[1] | | | | | | | 200 | 750 | | | | | |
| Time of reaction, minutes | 230 | 210 | 208 | 188 | 196 | 210 | 240 | 210 | 149 | 130 | 90 | 80–88 | 118 |
| Amount NaOH charged, mM | 1,424 | 1,429 | 1,430 | 1,427 | 1,430 | 1,479 | 1,458 | 1,458 | 1,419 | 1,430 | 1,430 | 1,456 | 1,432 |
| Batch of NaOH used | I | I | I | I | I | II | II | II | I | I | I | II | I |
| Initial weight percent: | | | | | | | | | | | | | |
| $H_2O$ | 0 | 0 | 5.0 | 10.0 | 15.4 | 5.0 | 5.0 | 5.0 | 0 | 0 | 0 | 0 | 5.00 |
| NaCl | 0 | 0 | 0.88 | 1.39 | 1.93 | 0.98 | 0.90 | 0.90 | 0 | 0 | 0 | 0 | 0.90 |
| $CH_3COONa$ | 0 | 0 | 0 | 0 | 0 | 0.49 | 0.50 | 0.50 | 0 | 0 | 0 | 0 | 0.50 |
| Results: | | | | | | | | | | | | | |
| Extrapolated initial rate, $CH_3CClF_2$ to $CH_2=CF_2$, mM./min | 6.61 | 9.77 | 9.07 | 7.84 | 7.21 | 9.33 | 6.41 | | 9.84 | 9.81 | 9.61 | 9.21 | 9.90 |
| Percent conversion: | | | | | | | | | | | | | |
| $CH_3CClF_2$ | 39.6 | 58.1 | 72.3 | 68.1 | 54.9 | 69.8 | 54.7 | 79.0 | 82.3 | 87.4 | 97.0 | 92.5 | 70.4 |
| NaOH | 61.2 | 85.3 | 99.0 | 91.6 | 73.5 | 98.8 | 92.2 | 99.0 | 97.8 | 97.3 | 88.2 | 66.0 | 97.3 |
| Percent selectivity: | | | | | | | | | | | | | |
| $CH_3CClF_2$ to $CH_2=CF_2$ | 99.6 | 99.5 | 99.3 | 99.2 | 99.5 | 99.5 | 98.2 | 99.5 | 95.2 | 89.8 | 86.5 | 94.40 | 71.5 |
| $CH_3CClF_2$ to $CH_3COONa$ | 0.39 | 0.52 | 0.66 | 0.84 | 0.45 | 0.53 | 1.15 | 0.53 | 4.81 | 10.2 | 14.5 | 5.59 | 28.5 |
| Percent of reacted NaOH used to make $CH_2=CF_2$ | | 98.0 | 97.5 | 97.5 | 98.1 | 98.0 | 95.5 | 97.9 | 81.3 | 68.8 | 58.8 | 80.3 | 38.6 |

[1] Unless the stirring rate is shown, stirrer was at a setting later shown to give a stirring rate of approximately 600 r.p.m.

TABLE III.—DEHYDROCHLORINATION OF 1,1,1-CHLORODIFLUOROETHANE IN VARIOUS SOLVENTS

| Run number | 22 | 23 | 24 | 25 | 26 | 27 |
|---|---|---|---|---|---|---|
| Conditions:[1] | | | | | | |
| Solvent | (2) | (3) | (4) | (5) | (6) | (7) |
| Stirring rate, r.p.m | 600 | 868 | 828 | 828 | 802 | 842 |
| Amount NaOH charged, mM | 1,479 | 1,453 | 1,451 | 1,458 | 1,456 | 1,461 |
| Batch of NaOH used | II | II | II | III | III | II |
| Results: | | | | | | |
| Percent conversions: | | | | | | |
| $CH_3CClF_2$ | 69.8 | 37.2 | 21.7 | 1.67 | 0.80 | 0 |
| NaOH | 98.8 | 75.7 | 38.7 | 2.53 | 1.15 | 0 |
| Percent selectivity: | | | | | | |
| $CH_3CClF_2$ to $CH_2=CF_2$ | 99.5 | 78.7 | 96.8 | | | |
| $CH_3CClF_2$ to $CH_3COONa$ | 0.53 | 21.3 | 3.2 | | | |
| Percent of reacted NaOH used to make $CH_2=CF_2$ | 98.0 | 55.1 | 87.9 | | | |
| Material balances: | | | | | | |
| Percent NaOH accounted for | 100.9 | 108.6 | 88.8 | | | 95.0 |
| Percent solubility, $CH_3CClF_2$ at 50° C. in solvent used | 3.49 | 5.90 | 11.51 | 7.55 | 10.04 | 4.82 |

[1] All runs conducted at 50° C., atmospheric pressure. Time of runs: 3½ hours. Charge: 300 cc. solvent, 60 g. NaOH. Input rate of $CH_3CClF_2$: 10 millimoles/minute.
[2] Dimethyl sulfoxide with 5% water.
[3] 2-(2-methoxyethoxy)-ethanol.
[4] Bis-(2-methoxyethyl)ether.
[5] Acetonitrile.
[6] Pyridine.
[7] Ethanol.

The apparatus was assembled and the flask purged with nitrogen for one-half hour. Solvent was added and nitrogen was bubbled through it gently for fifteen minutes. Powdered sodium hydroxide or other base was added, the previously purged 1,1,1-chlorodifluoroethane line was substituted for the nitrogen line, and stirring and heating were begun. When the desired temperature was reached, flow of 1,1,1-chlorodifluoroethane was started. Readings were taken on the inlet and outlet meters two to three minutes after beginning the flow and were usually taken just before and just after each gas sample was taken. At the end of the run, the inlet tube was lifted above the surface of the reaction mixture and the gas flow was stopped. Usually, the reaction mixture was cooled to or allowed to reach room temperature. It was then worked up as described above.

The runs shown in Table IV were conducted in a 300 cc. titanium autoclave equipped with a mechanical stirring unit. The procedure was essentially similar to that described above for runs in the 1-liter autoclave, except that the wet test meter was omitted.

TABLE IV.—DEHYDROCHLORINATION OF 1,1,1-CHLORODIFLUOROETHANE: NaOH versus KOH

| Run number | 41 | 42 |
|---|---|---|
| Conditions:[1] | | |
| Base used | NaOH | KOH |
| Amount of base charged, mM | 722 | 745 |
| Time of reaction, minutes | 93 | 81 |
| Initial weight, percent: | | |
| $H_2O$ | 5.0 | 3.9 |
| NaCl | 0.90 | |
| $CH_3COONa$ | 0.50 | |
| Results: | | |
| Extrapolated initial rate, $CH_3CClF_2$ to $CH_2=CF_2$, mM./min | 14.1 | 14.1 |
| Percent conversion, base | 99.0 | 98.9 |
| Percent selectivities: | | |
| $CH_3CClF_2$ to $CH_2=CF_2$ | 99.2 | 99.4 |
| $CH_3CClF_2$ to $CH_3COOM$ | 0.78 | 0.63 |
| Percent of reacted base used to make $CH_2=CF_2$ | 97.0 | 97.4 |
| Material balances: Percent base accounted for | 100.7 | |

[1] Runs conducted at 50° C. atmospheric pressure. Charge: 164 g. dimethyl sulfoxide, base as shown. Input rate of 1,1,1-chlorodifluoroethane: 19 millimoles/minute. Stirring rate: 1,540 r.p.m. Reactor: 300 cc. titanium autoclave.

Still another series of runs was conducted in homogeneous media. These included runs in a long, vertical glass tube and runs in a round-bottom flask similar to that used for the heterogeneous runs described above. Results of two typical flask experiments are presented in Table V.

DISCUSSION OF RESULTS

The main and almost sole reaction of 1,1,1-chlorodifluoroethane with sodium hydroxide in dimethyl sulfoxide at temperatures below about 60° C. was that shown earlier herein in Equation 5. 1,1-chlorofluoroethylene was observed to be present in the product to the extent of 0.1% or less. Moreover, usually only 2% or less of fluoride ion was found in the inorganic products (see Tables I and II) and the volume of gas out was usually within 2% of the gas in, with gas samples consisting almost solely of 1,1,1-chlorodifluoroethane and vinylidene fluoride. Typically, the percent conversion of 1,1,1-chlorodifluoroethane was 60–85% when utilization of sodium hydroxide was carried to greater than 90%. The percent of 1,1,1-chlorodifluoroethane diverted to the formation of sodium acetate was usually 1% or less, that to 1,1-chlorofluoroethylene about 0.1%. Generally at least 97% of the sodium hydroxide was consumed to make the desired vinylidene fluoride.

TABLE V.—DEHYDROCHLORINATION OF 1,1,1-CHLORODIFLUOROETHANE IN HOMOGENOUS SOLUTIONS

| Run number | 51 | 52 |
|---|---|---|
| Conditions:[1] | | |
| Base used | NaOH | $(CH_3)_4NOH$ |
| Grams solution charged | 238.8 | 241.3 |
| mM./g. OH⁻ in solution | 1.1426 | 1.1156 |
| Total mM. OH⁻ charged | 272.9 | 269.2 |
| Dimethyl sulfoxide/water (weight)[2] | 1.22 | 1.21 |
| Time of reaction, minutes | 147 | 153 |
| Results: | | |
| Extrapolated initial rate, $CH_3CClF_2$ to $CH_2=CF_2$, mM./min.[3] | 0.82 | 1.91 |
| Percent conversion: | | |
| $CH_3CClF_2$[4] | 16.1 | 35.5 |
| Base | 30.6 | 71.3 |
| Percent selectivities: | | |
| $CH_3CClF_2$ to $CH_2=CF_2$ | 99.5 | 97.4 |
| $CH_3CClF_2$ to $CH_3COO^-$ | 0.53 | 2.59 |
| Percent of reacted base used to make $CH_2=CF_2$ | 97.9 | 90.5 |
| Material Balances: | | |
| Percent base accounted for | 97.7 | 100 |
| Comparison of starting material converted with Cl⁻ formed | 102.9 | 101.0 |

[1] Reaction conducted in a 500 cc. round-bottom flask at atmospheric pressure, 90° C. Stirring rate: 600 r.p.m. Input rate of $CH_3CClF_2$: 3.4 millimoles/minute.
[2] A dimethyl sulfoxide/water ratio of 1.22 gave a solution containing 52 percent by weight of dimethyl sulfoxide where the base is sodium hydroxide, 49 percent by weight when the base is tetramethylammonium hydroxide.
[3] Instantaneous rates were determined by multiplying the percent conversions in each sample by the average input rate over 15–30 minutes prior to the time the sample was taken, as determined by wet test meter readings. The plot of rate versus time was then extrapolated back to zero time.
[4] 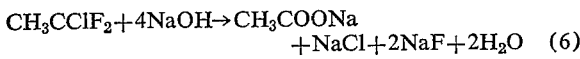

Acetate formation, shown in Equation 6

$$CH_3CClF_2 + 4NaOH \rightarrow CH_3COONa + NaCl + 2NaF + 2H_2O \quad (6)$$

was the most important side reaction and assumed increasing significance as reaction temperature was increased to 70° C. and higher in heterogeneous runs. The presence of acetate ion was shown by reaction of aniline with the dried salts to give acetanilide.

Dehydrofluorination of the feed, corresponding to Equation 7

$$CH_3CClF_2 + NaOH \rightarrow CH_2=CClF + NaF + H_2O \quad (7)$$

has been found to occur to only a very small extent even at high reaction temperatures.

Increasing the temperature from 30° to 90° C. at atmospheric pressure in heterogeneous systems increased the initial rate of reaction from 6.6 to 9.8 mM./min. (Table II.) It also increased the amounts of byproduct formed from virtually none to 6–15% based on converted 1,1,1-chlorodifluoroethane. When the base was sodium hydroxide and the solvent DMSO, 50° C. provided the best compromise between rate and selectivity.

In studying the effects of changes in pressure (see Table I), it was observed that the initial rate of conversion per unit time increased from 18 to 107 mM./min. as the pressure was increased from 0 to 75 p.s.i.g. at roughly equal nominal residence times. At pressures exceeding 85 p.s.i.g., 1,1,1-chlorodifluoroethane condensed to the liquid state. This tended to complicate the separation of unreacted material for recycle and offered no noticeable advantage.

The results from tests with other solvents, some of which are shown in Table III, showed clearly that DMSO was greatly superior to all the other solvents tried in facilitating the dehydrochlorination. The two next best solvents, 2-(2-methoxyethoxy)-ethanol and bis-(2-methoxyethyl) ether gave, respectively, only one-half and one-third the conversion to vinylidene fluoride obtained in dimethyl sulfoxide at 50° C. In addition the percent side reaction was at least 14% in the former solvent and 3% in the latter solvent. Only small amounts of vinylidene fluoride were formed using sulfolane, acetonitrile or pyridine, while essentially no reaction took place in xylene, ethanol, methanol or water with sodium hydroxide.

The results in DMSO itself varied depending on the amount of water present initially. In pressure runs (Table I), the percent sodium hydroxide consumed in a given period in DMSO containing 5% water was only 6% less than that consumed in nominally dry DMSO, while the utilization of starting material was considerably more efficient in the first case. At atmospheric pressure (Table II), utilization of both the base and the organic starting material was more efficient in DMSO containing 5% water than DMSO containing less or more water. This came about because the more water was present initially, the lower the initial rate of reaction was, but the less rapidly the rate decreased as the reaction proceeded. In solvent containing 5% or more water initially, the rate curve eventually underwent a change toward a steeper downward slope, and this occurred earlier for runs having 8% or more water than for those having 5% initially. Also the initial rate in a mixture containing a known weight of water tended always to be greater than the rate obtained after an equivalent amount of water had presumably been formed in mixtures of lower initial water content. These effects probably arose at least partly because the metal hydroxide partially dehydrated the DMSO mixtures during the major portion of these runs. The observed results also suggest that the alkali metal hydroxide is a less effective dehydrating agent in the presence than in the absence of sodium chloride.

In a commercial process employing recycle of solvent, it appears advantageous to adjust the water content of the solvent to about 5% and to accept the presence of saturation levels of sodium chloride and sodium acetate that such a water content entails. Results in the presence or absence of sodium acetate in the solvent were the same.

As shown in Table IV, sodium hydroxide and potassium hydroxide appear equivalent when a small amount of water is present in the system. Anhydrous potassium hydroxide is known to be more basic than anhydrous sodium hydroxide, but the water present apparently levels this difference. The weaker bases lithium hydroxide and barium oxide were somewhat effective while calcium oxide and magnesium hydroxide were ineffective as was sodium fluoride.

Within the limits tried, the rate of conversion per unit time of 1,1,1-chlorodifluoroethane increased with increasing feed rate while the percent conversion decreased.

In evaluating the effect of stirring, the runs in which the stirring rate was varied from 600 to 200 r.p.m. at atmospheric pressure showed that conversion rate tends to decrease with decreasing stirring rate, although not drastically. In runs conducted at 70 p.s.i.g. pressure, changing the stirring rate from 1010 to 1540 r.p.m. did not change conversion very much. Accordingly, while the results suggest that the reaction is not strongly affected by the rate of stirring, good agitation is advantageous.

Normally a homogeneous medium is desirable for reaction and was investigated for this reason. As described earlier herein, sodium hydroxide is rather insoluble in DMSO so that the amount which will dissolve depends upon the amount of water added. In these homogeneous systems, dehydrochlorination occurred with a high degree of selectivity at 90° C. The reaction rate was about one-tenth that obtained in the heterogeneous DMSO system even at 50° C. The rate increased with increasing DMSO concentration, base concentration and pressure. Increasing the feed rate had a more pronounced effect in 52% than in 43% DMSO.

A solution containing sodium chloride initially, gave slower rates than one containing the same amount of sodium hydroxide but no sodium chloride initially. Also slightly higher rates were obtained in a run in which sodium chloride was present initially than in another run in which the equivalent sodium chloride concentration was formed in the reaction. Tetramethylammonium hydroxide has been found to give a faster rate than sodium hydroxide in homogeneous systems, but also gave somewhat more side reaction. Consequently, the use of sodium hydroxide or potassium hydroxide should be preferred under most circumstances. The use of these alkali metal hydroxides in a heterogeneous mixture with DMSO at relatively mild temperatures, e.g., between about 40° and 60° C., should be especially preferred.

The invention for which protection is sought is particularly pointed out in the appended claims.

We claim:

1. A process for the production of an ethylenically unsaturated fluorocarbon corresponding to the formula $CH_2=CFR$ wherein R is fluorine or hydrogen by dehydrohalogenation of a saturated fluorine-containing compound corresponding to the formula $CH_3—CFXY$ wherein X is a halogen and Y is hydrogen or a halogen other than fluorine and selected from the group consisting of 1,1,1-chlorodifluoroethane, 1,1-chlorofluoroethane and the corresponding bromofluoro and iodofluoro compounds, which process comprises contacting said saturated fluorine-containing compound as a gas at a temperature between about 18° and 150° C. with a liquid mixture containing sodium hydroxide, potassium hydroxide or a tetra-alkyl ammonium hydroxide in dimethyl sulfoxide solvent, and recovering unsaturated fluorocarbon product therefrom.

2. A process according to claim 1 wherein the saturated fluorine-containing compound is 1,1,1-chlorodifluoroethane and the unsaturated fluorocarbon product is vinylidene fluoride.

3. A process according to claim 2 further characterized in being conducted at a pressure between about 50 and 85 p.s.i.g.

4. A process for the production of vinylidene fluoride which comprises mixing 1,1,1-chlorodifluoroethane as a gas in a reaction zone at a temperature between about 40° and 120° C. and a pressure between about 0 and 80 p.s.i.g. with a liquid mixture containing about 2 to 30 parts sodium hydroxide, potassium hydroxide or a tetra-alkyl ammonium hydroxide in 100 parts dimethyl sulfoxide solvent, and withdrawing a product gas rich in vinylidene fluoride.

5. A process according to claim 4 wherein said liquid mixture is a heterogeneous phase which consists essentially of the alkali metal hydroxide suspended in dimethyl sulfoxide solvent containing not more than about 10% water, the reaction zone is maintained at a temperature between about 40° and 60° C. and a pressure between about 50 and 80 p.s.i.g. and the resulting product gas, aside from unreacted starting material, consists essentially of vinylidene fluoride and not more than about 0.3% contaminants.

6. A process according to claim 5 wherein spent liquid mixture is withdrawn from the reaction zone, solid sodium chloride is mechanically separated from the liquid solvent, and the regenerated solvent returned to the reaction zone with additional alkali metal hydroxide.

7. A process according to claim 4 wherein said liquid mixture is a homogeneous solution consisting essentially of the alkali metal hydroxide or tetra-alkyl ammonium hydroxide dissolved in dimethyl sulfoxide containing between about 30 and 70% water, and the reaction zone is maintained at a temperature between about 80° and 120° C.

8. A process according to claim 7 wherein said liquid mixture is a homogeneous solution consisting essentially of tetramethylammonium hydroxide dissolved in aqueous dimethyl sulfoxide.

9. A process according to claim 7 wherein spent liquid mixture is withdrawn from the reaction zone, contacted with an anion exchange resin containing available hydroxyl ions to thereby convert sodium chloride present in the liquid mixture to sodium hydroxide, and returning the resulting regenerated liquid mixture to the reaction zone.

References Cited

UNITED STATES PATENTS 2,924,626  2/1960  Boyer et al. _____ 260—653.5

DANIEL D. HORWITZ, Primary Examiner